United States Patent
Östergaard

[19]

[11] Patent Number: 6,024,514

[45] Date of Patent: Feb. 15, 2000

[54] TOOL, TOOL SYSTEM AND METHOD FOR COUPLING AND INSTALLING SUBSEA PIPELINES

[75] Inventor: Inge Östergaard, Heggedal, Norway

[73] Assignee: ABB Offshore Technology A/S, Billingstad, Norway

[21] Appl. No.: 08/981,076

[22] PCT Filed: May 24, 1996

[86] PCT No.: PCT/NO96/00129

§ 371 Date: Feb. 19, 1998

§ 102(e) Date: Feb. 19, 1998

[87] PCT Pub. No.: WO96/38688

PCT Pub. Date: Dec. 5, 1996

[30] Foreign Application Priority Data

May 29, 1995 [NO] Norway .................................. 952123

[51] Int. Cl.[7] .............................................. F16L 1/26
[52] U.S. Cl. ............................................ 405/170; 166/343
[58] Field of Search ................................ 405/166, 169, 405/170; 166/343, 344

[56] References Cited

U.S. PATENT DOCUMENTS

| Re. 29,364 | 8/1977 | Robley | 405/157 |
|---|---|---|---|
| 4,091,514 | 5/1978 | Motes-Conners et al. | 29/33 P |
| 4,116,015 | 9/1978 | Duncan | 405/169 |
| 4,218,158 | 8/1980 | Tesson | 405/170 |
| 4,832,530 | 5/1989 | Andersen et al. | 405/170 |
| 4,906,136 | 3/1990 | Norbom et al. | 405/169 |
| 5,501,549 | 3/1996 | Breda et al. | 405/169 |
| 5,593,249 | 1/1997 | Cox et al. | 405/191 |

FOREIGN PATENT DOCUMENTS

| 134315 | 1/1971 | Norway . |
|---|---|---|
| 139100 | 6/1974 | Norway . |
| 149254 | 7/1978 | Norway . |
| 176627 | 5/1994 | Norway . |
| 1 596 782 | 8/1981 | United Kingdom . |
| WO 95/30853 | 11/1995 | WIPO . |

OTHER PUBLICATIONS

Translation of claim 1 of NO 149254.

*Primary Examiner*—David Bagnell
*Assistant Examiner*—Tara L. Mayo
*Attorney, Agent, or Firm*—Akin, Gump, Strauss, Hauer & Feld, L.L.P.

[57] ABSTRACT

The invention relates to a system for intercoupling of two pipeline which are located in a subsea position. A second pipeline (12) is preinstalled on a bottom based template or frame (10), and a first pipeline (2) is initially freely positioned, located in a smaller or larger distance from said second pipeline. Equipment is available for transport of said first pipeline to the bottom frame with said second pipeline, and equipment for positioning, holding and coupling of the pipelines, such that a pressure resistant, strong coupling is provided between the same. One aspect of the invention relates to a ring-shaped, open seat (18) mounted on the bottom frame (10) at a certain space in front of a terminator (14) on the end of the second pipeline (12) mounted on the bottom frame (10). For transport of the first pipeline (2), normally localized at a distance from said second pipeline, a combined gripping and transport tool (8) is utilized which in operational position is suspended at the bottom of a ROV (6), which gripping tool comprises at least one pair of opposed clawlike elements (40, 42) which can be pivoted from an outer position to an inner position, wherein the claw elements form a substantially circular space for circumscribing and holding said second pipeline.

13 Claims, 15 Drawing Sheets

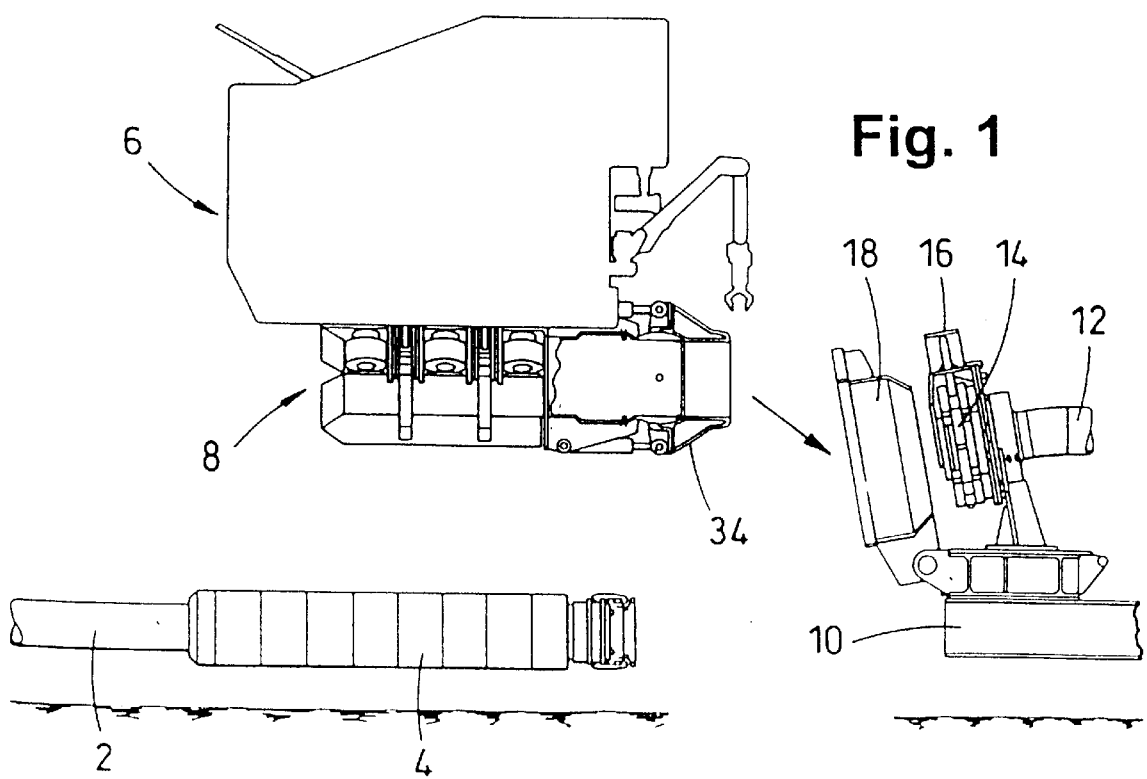

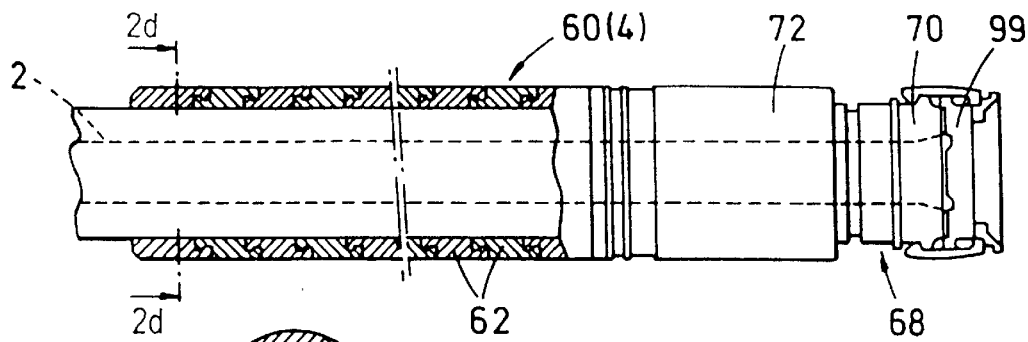
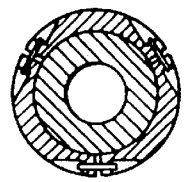
Fig. 2a
Fig. 2d
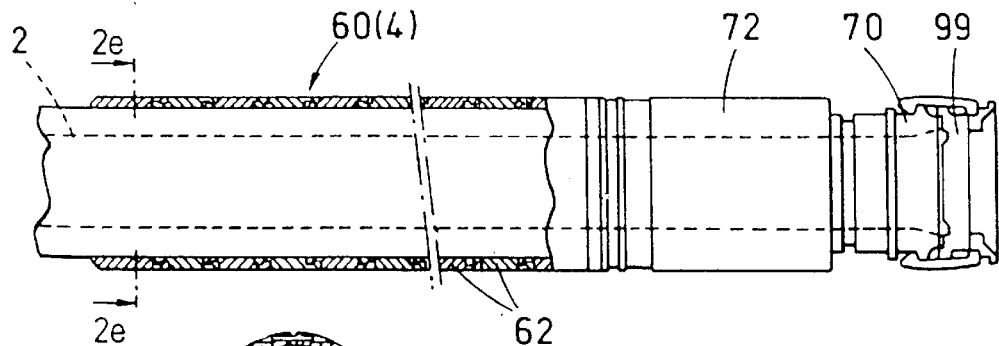
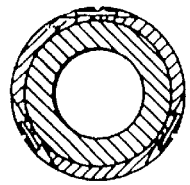
Fig. 2b
Fig. 2e
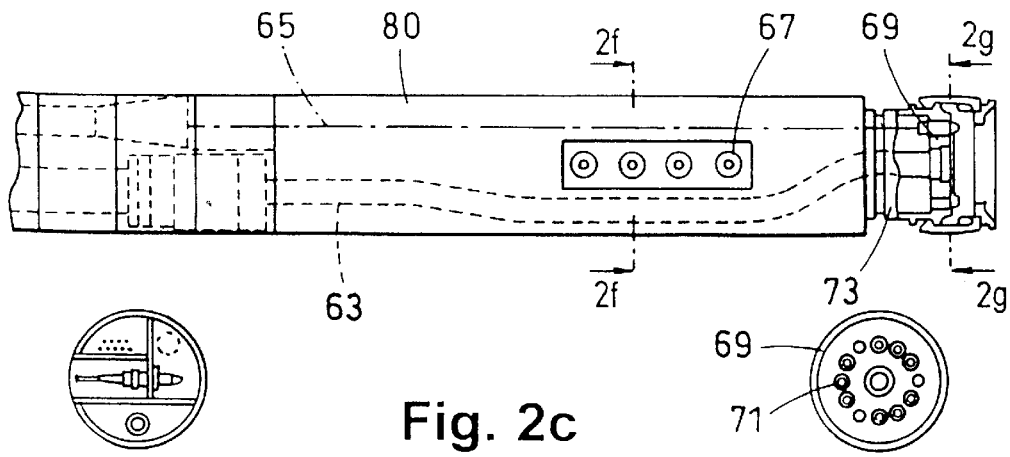
Fig. 2c
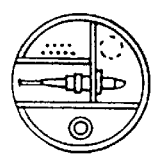
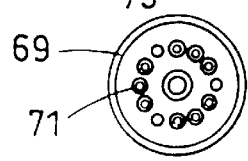
Fig. 2f
Fig. 2g

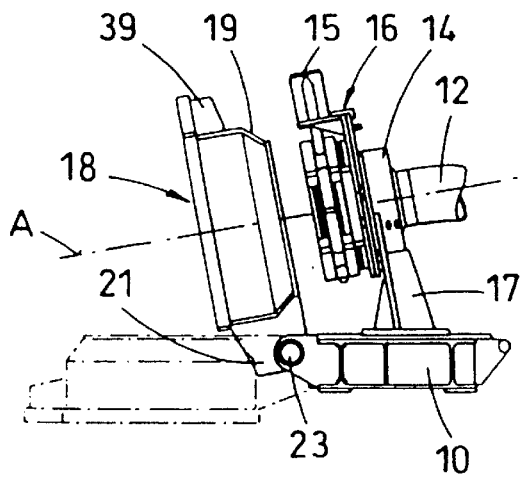
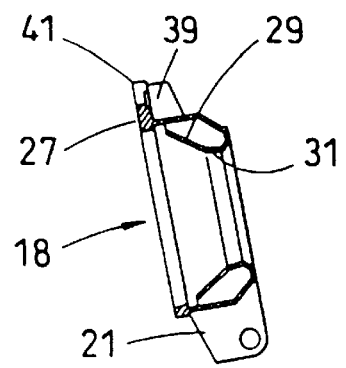
Fig. 7a  Fig. 7b
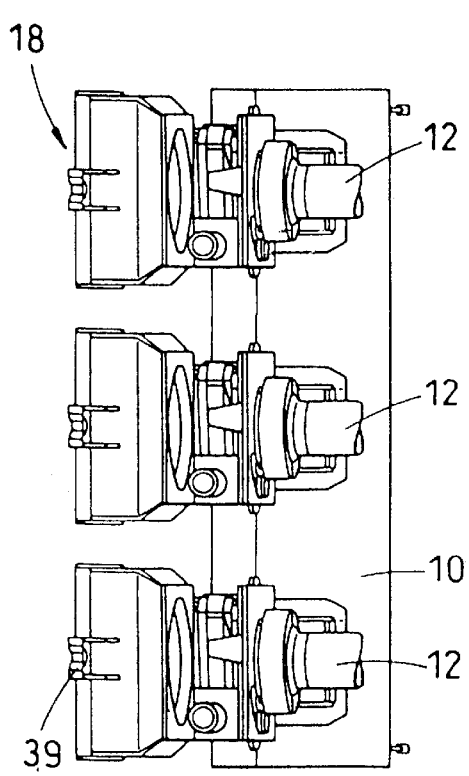
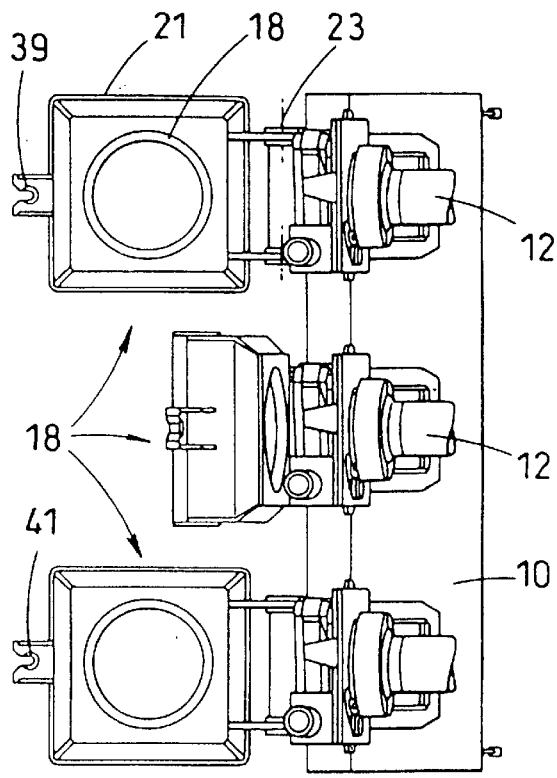
Fig. 8a  Fig. 8b

TOOL, TOOL SYSTEM AND METHOD FOR COUPLING AND INSTALLING SUBSEA PIPELINES

CROSS-REFERENCE TO RELATED APPLICATION

This is a 371 of International Application PCT/NO96/00129, with an International Filing Date of May 24, 1996.

BACKGROUND OF THE INVENTION

The present invention relates to a tool, a tool system and a method to be used for coupling and installation of subsea pipelines. As illustrative for the prior art, it is referred to Norwegian patents 149254 and 176627, further GB publication 1596782 and finally applicant's pending patent application 941688.

BRIEF SUMMARY OF THE INVENTION

The main object for the present invention is to develop a simpler, more compact system for carrying out such operations. A further object has been to develop solutions which are time-saving and more dependable in use.

A further important object of the invention has been to develop solutions which reduce the need for permanent installation of complicated equipment on the sea bottom to be used in connection with the installation and maintenance, such that the installation and the maintenance for a great part can be carried out by means of submersible tools which may be mounted on a ROV.

A further aspect of the invention relates to development of a special submersible tool, preferably to be mounted on a ROV, to accomplish coupling of subsea pipelines, such as a first pipeline which initially is located on a sea bottom or in submerged position in the sea, and a second pipeline with a terminator, which may be installed on a bottom based frame, template or the like, which tool is provided with means for catching and holding said first pipeline for transport to the second pipeline mounted on the bottom based frame, the tool being generally characterised in that it is provided with two or more couples of pivotable, brace-like arms which are pivotable from an outer position where the brace arms may grip around an intermediately positioned pipeline, and an inner position wherein the pipeline is being kept in a directionally immobile position in the brace arms, means mounted in the tool in conjunction with the brace arms for imparting a pipeline held by the brace arms an axial movement relative to the tool, which tool at the fore end is provided with a ring-shaped anchoring head concentrically positioned relative to the longitudinal axis through the pipeline, which anchoring head is adapted to be mounted on the bottom frame.

An important advantage of the tool in accordance with the invention, is that the tool may accomplish both the transport and the necessary forced forward displacement of the end section on the first pipeline to a coupling position when the second pipeline has been installed on the bottom frame. Thereby, the need for mechanical equipment on the bottom frame may be reduced.

A further aspect of the invention concerns a submersible tool system which in addition to a tool as above described, includes special implements for positioning and anchoring of the tool with the pipeline on the bottom frame, including special coupling equipment.

The submersible tool system in accordance with the invention thus includes equipment to catch, hold and transport the first pipeline from its initial position to a position adjacent to the second pipeline mounted on the bottom frame, which tool for gripping and transport of the first pipeline includes means for holding the tool on the bottom frame in connection with the intercoupling of the respective pipelines, and the system is characterised in that the tool for holding and transport of the first pipeline includes means for axial movement of the first pipeline in mounted position in the tool, said means for holding the tool on the bottom frame comprises a ringshaped anchoring head positioned axially in front of the tool, such that the first pipeline can be moved through the anchoring head to position on the bottom frame in front of the second pipeline mounted thereon, and in that the means on the bottom frame for receipt of the anchoring head on the tool is devised as a ringshaped seat adapted to circumscribe the first pipeline in mounted position, which ringshaped seat is provided with cooperating implements for holding and anchoring of the anchoring head in mounted position.

An operative embodiment of the tool system will suitably include equipment for transporting the tool with the first pipeline from the initial position to the bottom frame. In conventional manner, a pulling line connected to a winch is suitably used, which line suitably extends from a point on the bottom frame to the tool.

A further aspect of the invention implies a special procedure or method to accomplish the entire coupling operation by use of the tool system in accordance with the invention.

BRIEF DESCRIPTION OF THE SEVERAL VIEWS OF THE DRAWINGS

Other features and solutions in accordance with the invention will appear from the following description with reference to the accompanying drawings, wherein:

FIG. 1, 1' and 1a 1 and 1a 2 are perspective layout views illustrating the equipment encompassed by the invention, herein shown in an initial position prior to the coupling operation having been initiated, where FIG. 1 shows a ROV with mounted coupling, FIG. 1a 1 shows a freely positioned first pipeline which shall be coupled to the second pipeline, and FIG. 1a 2 shows a bottom template or frame with other pipes etc. which already have been installed on the bottom frame, FIG. 2d is a sectional view taken along line 2d—2d of FIG. 2a, FIG. 2e is a sectional view taken along line 2e—2e of FIG. 2b, FIG. 2f is a sectional view taken along line 2f—2f of FIG. 2c, FIG. 2g is a sectional view taken along line 2g—2g of FIG. 2c, FIG. 3a, b, and c are lateral views showing a ROV and the special gripping and transport tools in accordance with the invention as shown in FIG. 1a, herein shown on FIG. 3a and 3b from the side of the tool in mounted position, respectively, while FIG. 7a shows a side view of the receiving station on the bottom frame, comprising the ringshaped seat unit and the second pipe with various coupling equipment, FIG. 7b is a fragmentary, sectional view of the seat and the supporting frame therefore, as shown in FIG. 7a, FIG. 8a, b and c show a plan view, a top view and a side view of a modular installation comprising three complete receiving stations, respectively, as shown in FIG. 7.

DETAILED DESCRIPTION OF THE INVENTION

Figure 1B:
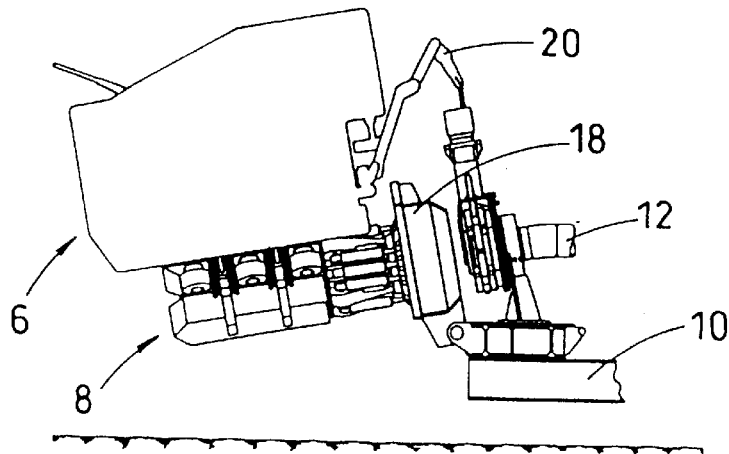
FIG. 1b–s are sketches which illustrate altogether 20 operational steps for carrying out a coupling operation with the equipment in accordance with the invention, FIG. 2a, b, c, and d with separate detail cross-sectional views illustrate various embodiments of pipelines which can be handled by the equipment according to the invention.

FIG. 1, 1' and 1a1 and 1a2 give a general view showing the various parts in the system, shown in a position on the sea bottom at a certain distance from each other, the reference numeral 2 in FIG. 1a1 designating the ingoing, free first pipeline which in a preferred embodiment is provided with a special <<cuff>> or jacket 4 in accordance with the invention. 6 designates a so called ROV (Remote Operated Vehicle), on the bottom of which is suspended the gripping and transport tool 8 in accordance with the invention. FIG. 1a2 shown to the right shows a template or bottom frame 10 on which is mounted a second pipeline 12, provided with a terminator 14 including a coupling tool 16. On the template 10 is further mounted a special ringshaped seat 18 in accordance with the invention, which is positioned axisparallel and optionally coaxially in front of the terminator 14 on the pipeline 12.

Figure 1C:
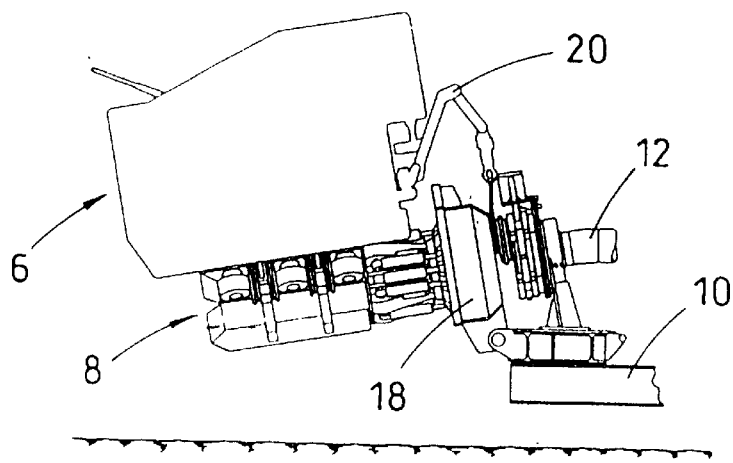
Figure 1D:
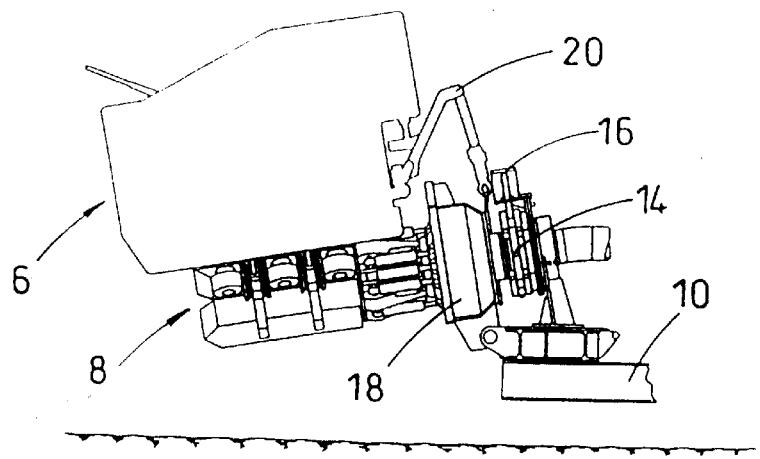
Figure 1E:
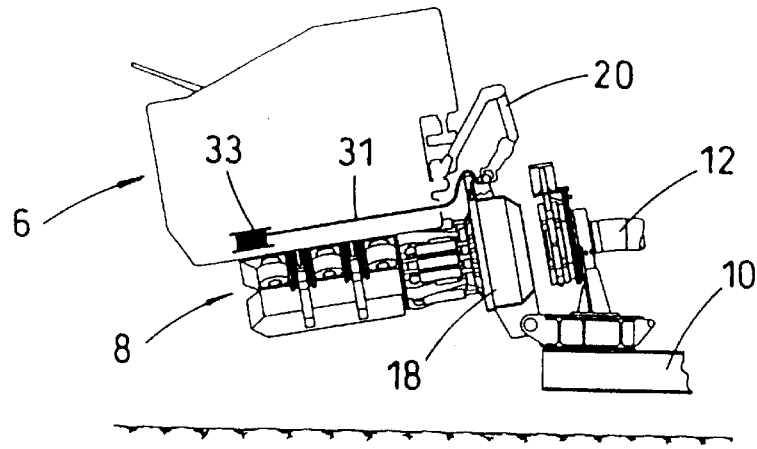
Figure 1F:
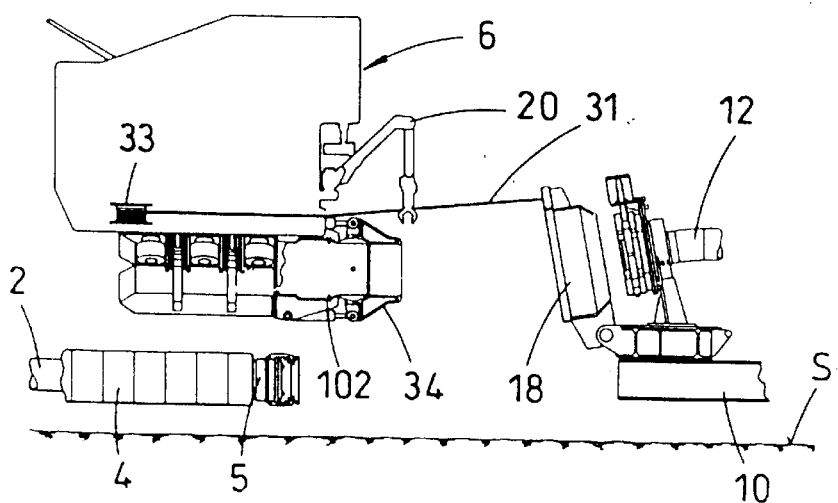
Figure 1G:
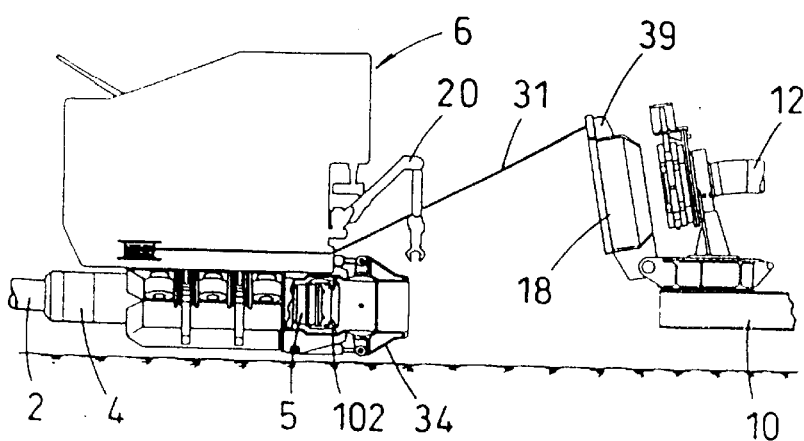
Figure 1H:
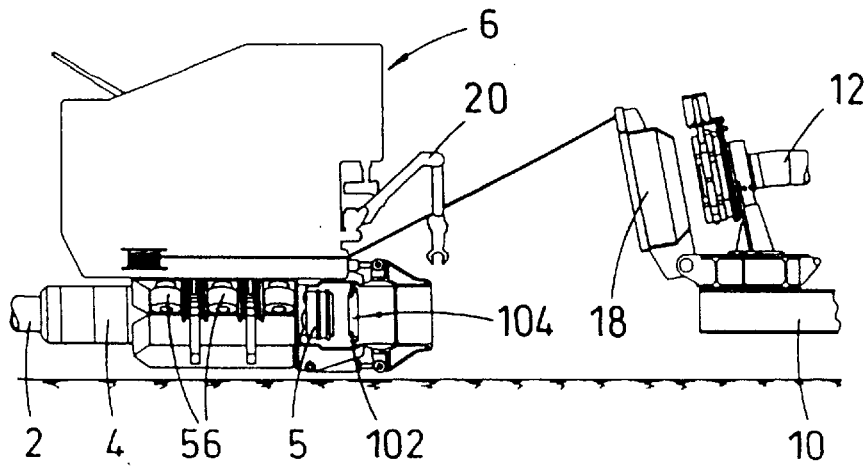
Figure 1I:
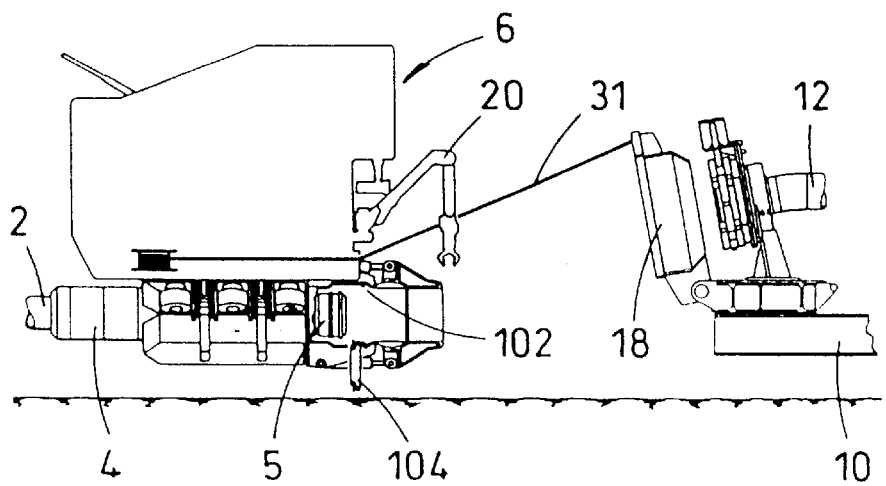
Figure 1J:
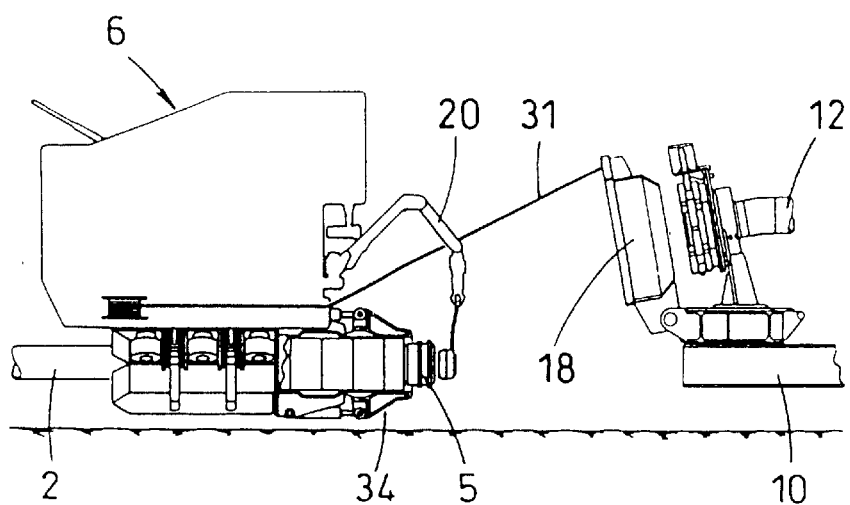
Figure 1K:
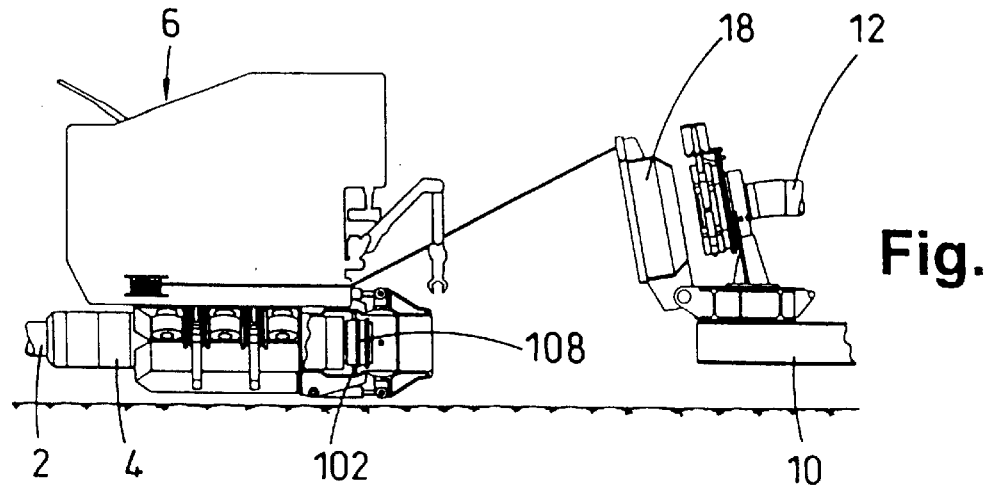
Figure 1L:
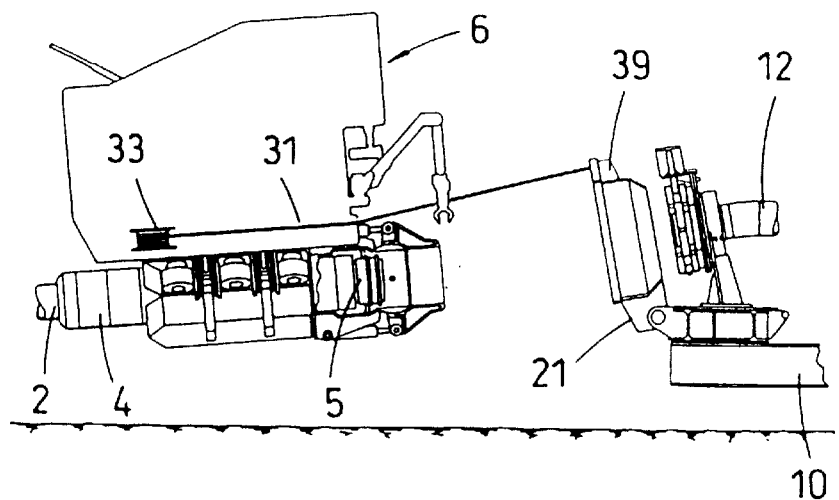
Figure 1M:
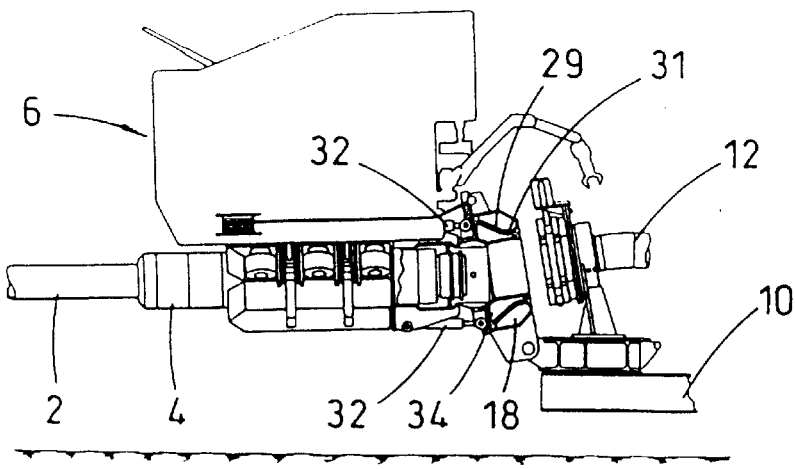
Figure 1N:
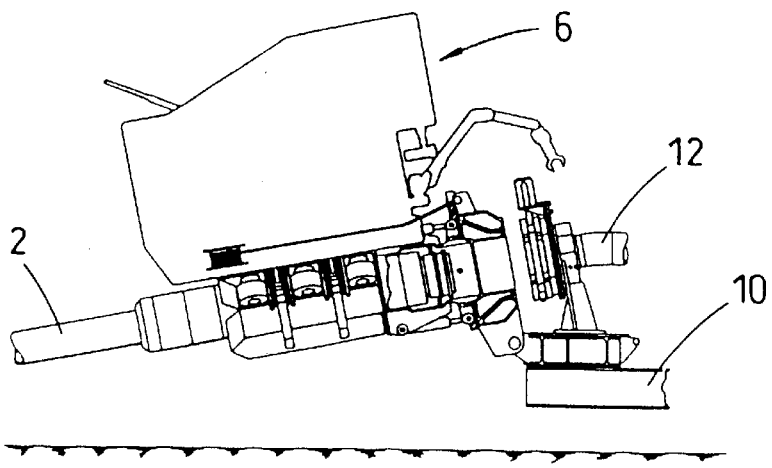
Figure 1O:
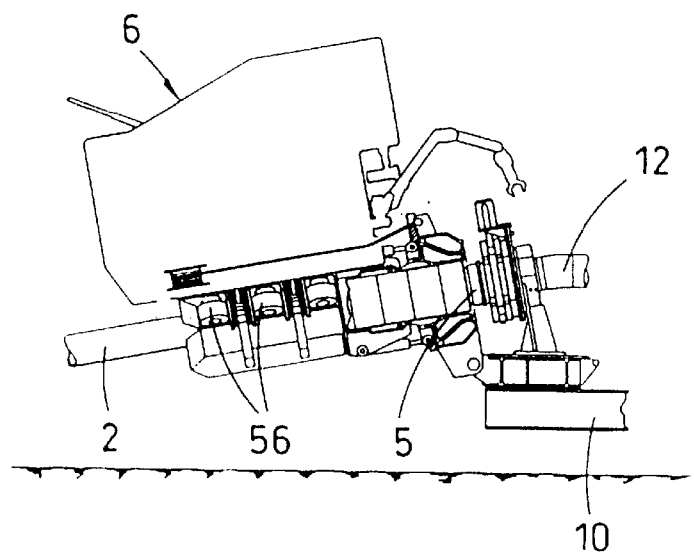
Figure 1P:
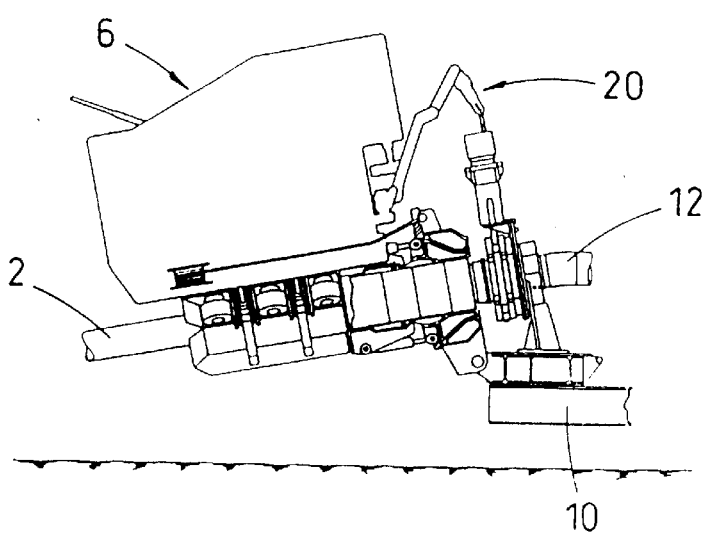
Figure 1Q:
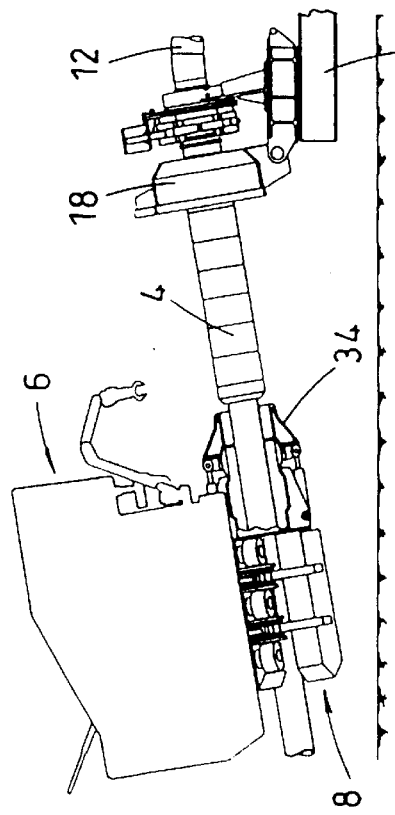
Figure 1R:
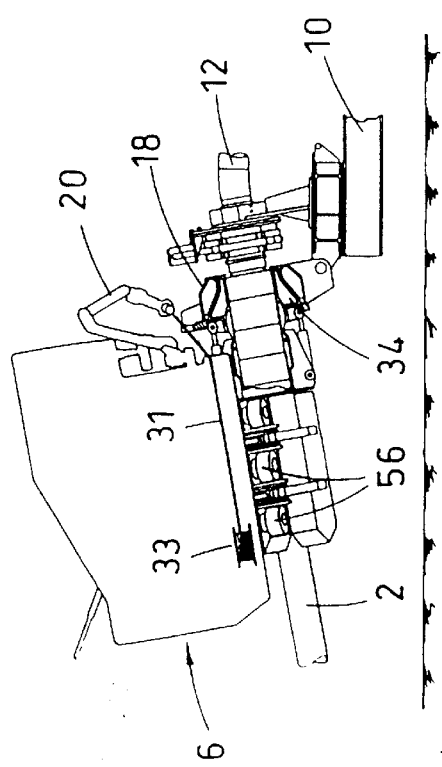
Figure 1S:
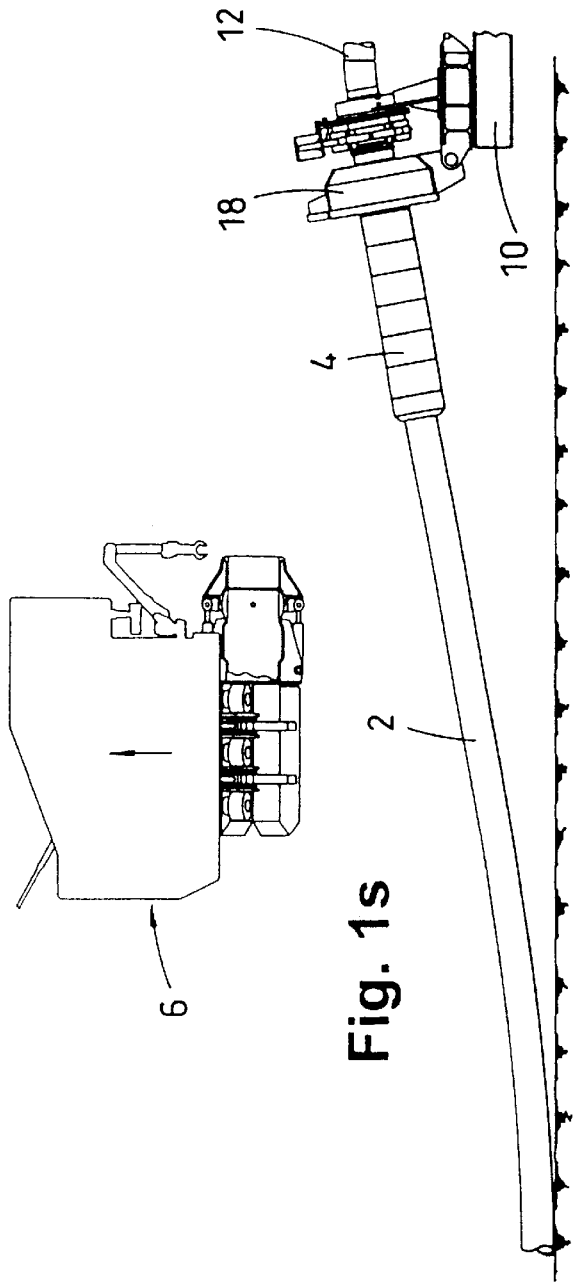

Prior to a further description of the function and working procedure as illustrated in FIG. 1b–s, the before mentioned parts of the system as shown in FIG. 1a1 and 1a2 shall be described in detail.

Figure 3A:
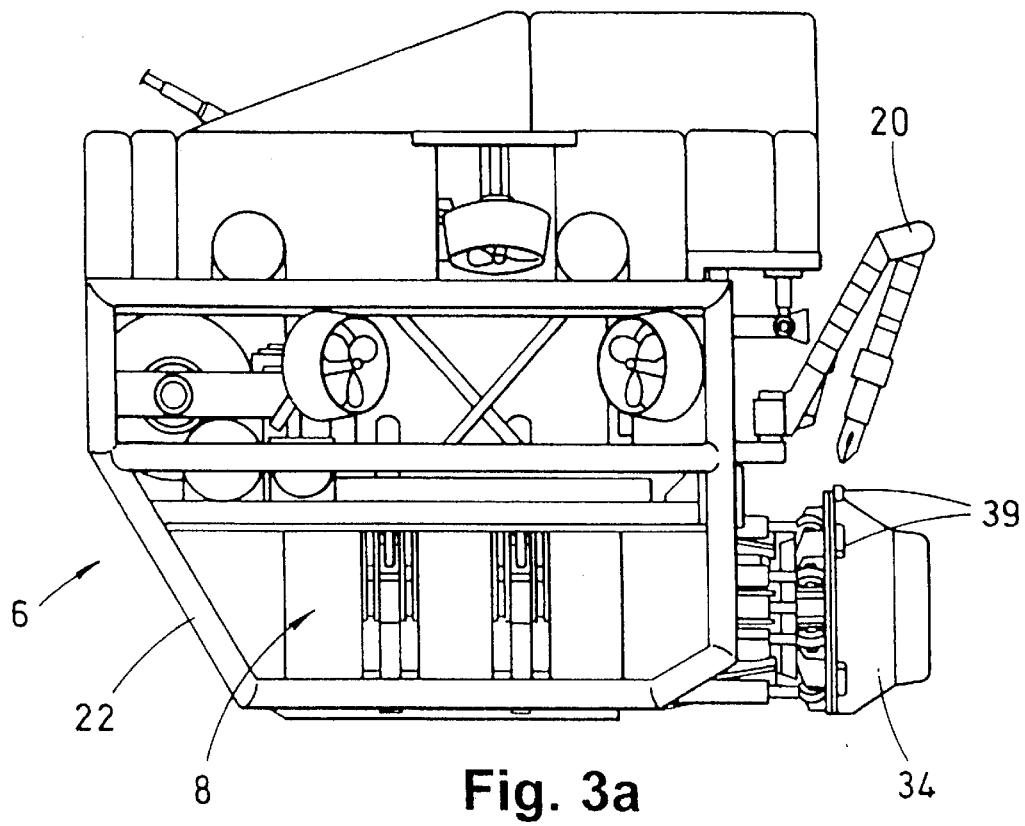
FIG. 3c shows the tool laterally in released position from the ROV, FIG. 4a, b, c, and d are cross-sectional views taken along planes A—A, B—B, C—C and D—D, respectively, shown in FIG. 3c, FIG. 5a and b are lateral views, shown partly in section, of the gripping tool and which particularly illustrate the construction for angularly forced guiding of the front part of the tool or head relative to the rest of the tool.

FIG. 3 and 4 including the detail sketches illustrate the construction and operation of the combined gripping and transport tool in accordance with the invention. In FIG. 3a and b showing a lateral and front view, respectively, of the ROV 6 with suspended tool 8, it appears that in front of the ROV is mounted an interlinked manipulator tool 20 to accomplish the various mechanical steps during the various coupling operations. The ROV is on the underside provided with a downwardly suspended support frame 22 with mutually spaced frame legs 24, 26 adapted to straddle the tool 6 in mounted position.

Figure 3B:
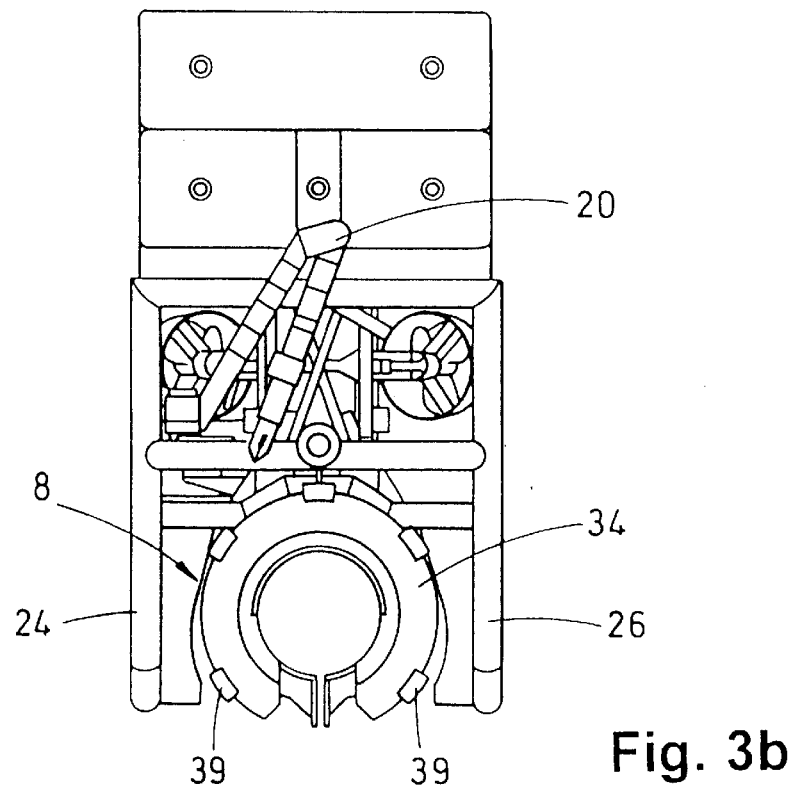
Figure 3C:
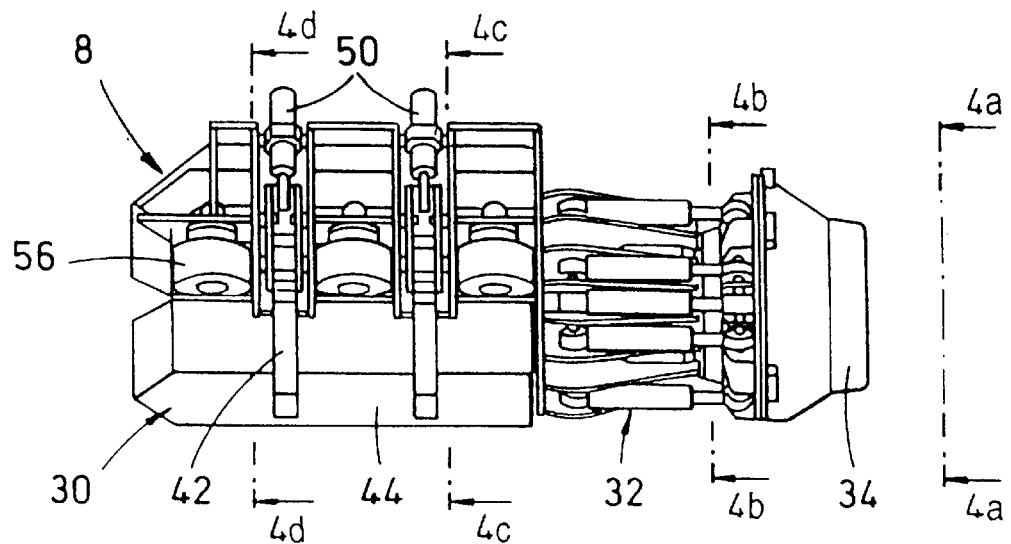

FIG. 3c is a lateral view of the tool 8 in released position from the ROV. The combined gripping and transport tool comprises three sections, namely a rear section 30 including the gripping and transport means, an intermediate section 32 comprising a circumferentially distributed link arm system, including hydraulic cylinders or the like, and a front section 33 comprising a pivotable anchoring head 34 mounted on the front end of the link arms in section 32, the anchoring head 34 adapted to be positioned in the ringshaped seat 18 shown in FIG. 1 during the coupling operations. On the inside of the rear section 30 is on the inside of support frame 54 adjacent the gripping arms, mounted a plurality of transport rollers 56, 56, 56, in the shown embodiment three such rollers on each side of the frame 54. Such as shown in FIG. 4d, these rollers are connected to not shown hydraulic motors or the like, and can be forcibly rotated in either direction. By means of these rollers, a pipeline held in the gripping tool can be moved axially in either direction.

Figure 4A:
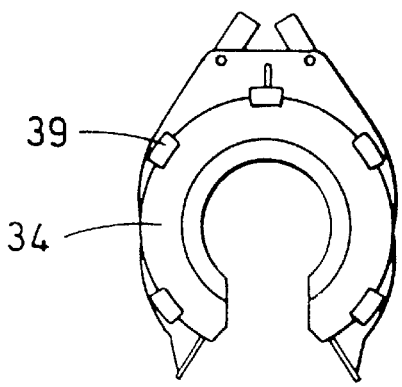
Figure 4B:
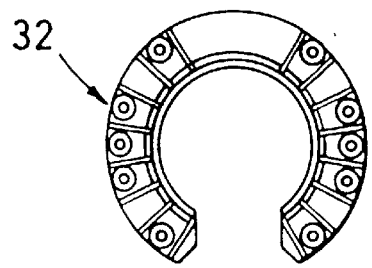
Figure 4C:
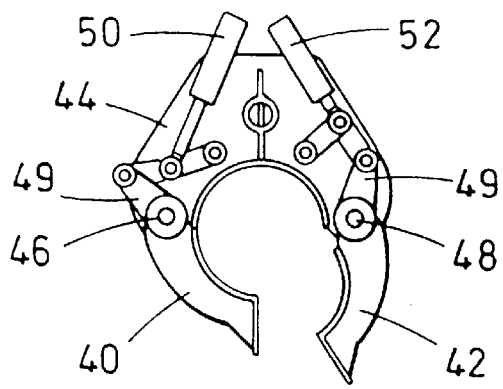
Figure 4D:
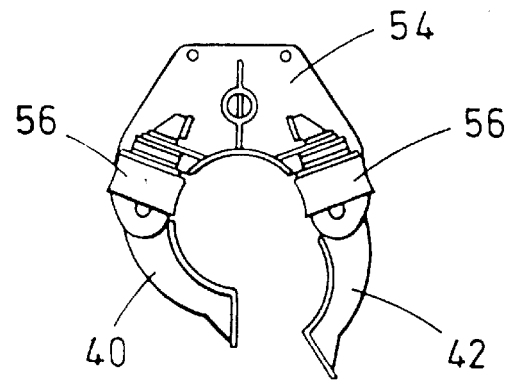

The rear section 30 is suitably longitudinally shaped and comprises as further shown in FIG. 4a, b, c and d, the gripping tool which comprises claw shaped opposed arm couples 40, 42 which are spaced longitudinally as shown in FIG. 3c and which suitably may be shaped as curved shuffles. The gripping arms 40, 42 etc. are link supported on upper pivots 46, 48, and are provided with upwardly pointing parts 49, 49 connected to a link suspension connected with hydraulic cylinders 50, 52, such that the arms can pivot forcibly between an outer position and an inner position as shown in FIG. 3b, wherein the gripping arms are in mutual contact at the bottom The gripping tool is shown in detail in 4a, b, c and d, showing sectional views along planes 4a—4a, 4b—4b, 4c—4c shown in FIG. 3c. Detail sketch 4a shows the gripping tool viewed from the front along plane 4a—4a shown in FIG. 3c, FIG. 4b shows the link arms 32 along plane 4b—4b, FIG. 4c shows the gripping arms 40, 42 seen along plane 4c—4c(in partly open position), while FIG. 4d shows a rear cross-section of the gripping tool.

Figure 5A:
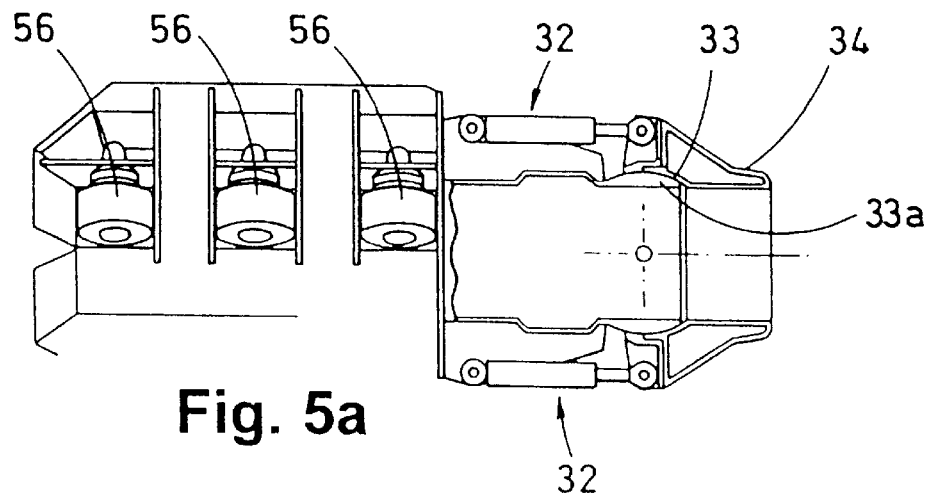
Figure 5B:
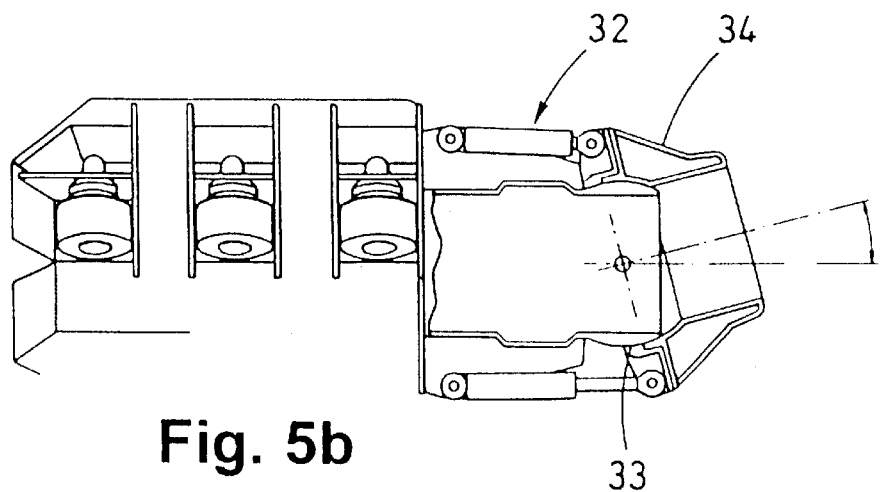

As best shown in FIG. 5a and b, the anchoring head 34 is pivotably mounted on the front part of the gripping tool by means of a plurality of the circumferentially distributed, adjustable link arms 32, which may consist of hydraulically working cylinders The head 34 is designed with a semicircular bearing surface 33 which straddles a complementary biasing surface 33a formed on the front part 37 on the tool frame 54. Thereby, the head 34 can be firmly held and forcibly adjusted into different angular positions relative to the longitudinal axis C through the tool, as shown in FIG. 5b.

FIG. 6a—d are longitudinal, schematic sketches through the front section of the tool, showing the inside construction of the tool to be used in connection with the handling of the first pipeline, and the construction of the terminator 68 on the first pipeline 2. On the terminator 68 is mounted a special quick coupling for an end lid or pressure cap 99, positioned on the open end of the first pipeline, when the same is in above water position, This coupling consists of a plurality of circumferentially arranged bracelike pawls 108, which at the left end are resting on the outside of a flange 110 on the terminator, while the other ends are biased on the outside of intermediately positioned individual latch pieces 112, resting against a ringshaped groove formed in the end cap. Thereby, the pressure cap 99 is kept in pressure resistant manner on the pipe end. In order to release the pressure cap in subsea position is utilized a special latch ring 114, which is connected to the pressure cap by means of so called cutter bolts or cutter screws 116, which are attached to the pressure cap. By means of the tool, the pipeline is transported into position in which a number of inwardly movable latch pins 102 in the tool can be guided into a groove 116 on the latch ring. This step in the coupling procedure appears from FIG. 1g, and is as mentioned also shown in FIG. 6a. When the latch pins have been moved into the latch ring, the pipeline including the before mentioned parts are displaced somewhat backwards, having in consequence that the latch ring is torn loose together with the end cap, simultaneously as the cutter bolts are broken off. Thereby, the step shown in FIG.

Figure 6A:
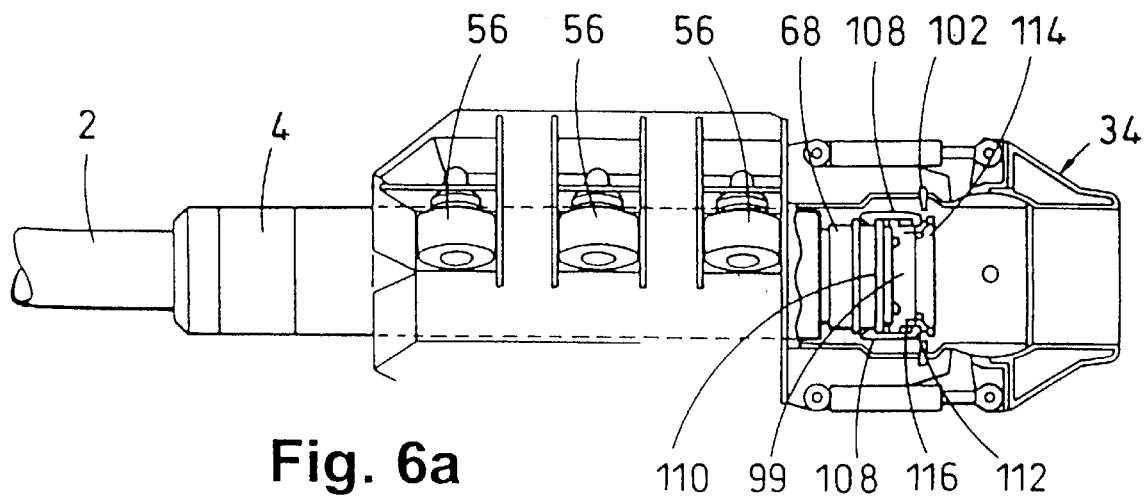
FIG. 6a–d are schematic, longitudinal sectional views through the tool with gripped or mounted pipeline, and which further illustrate the construction of the front part of the tool and likewise the front part of the pipeline including the terminator, and end cap and the locking means for the same.
Figure 6B:
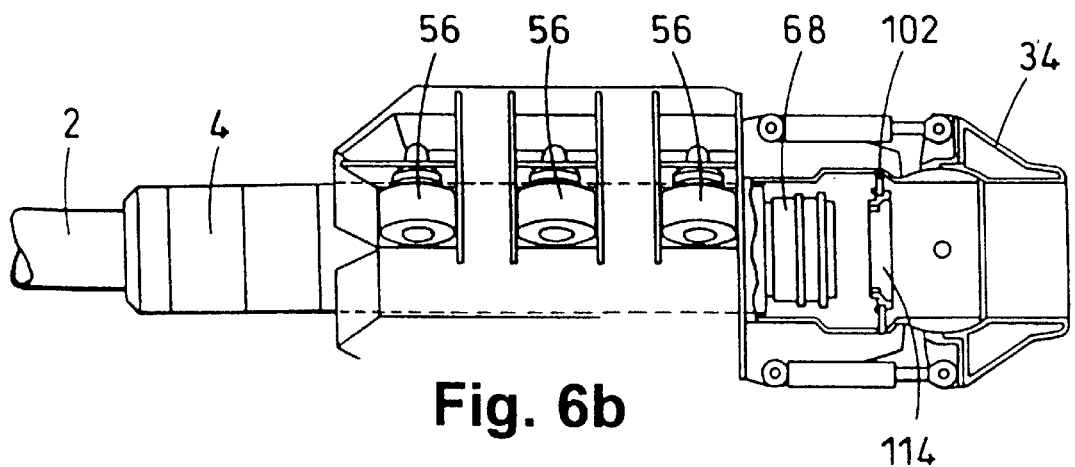
Figure 6C:
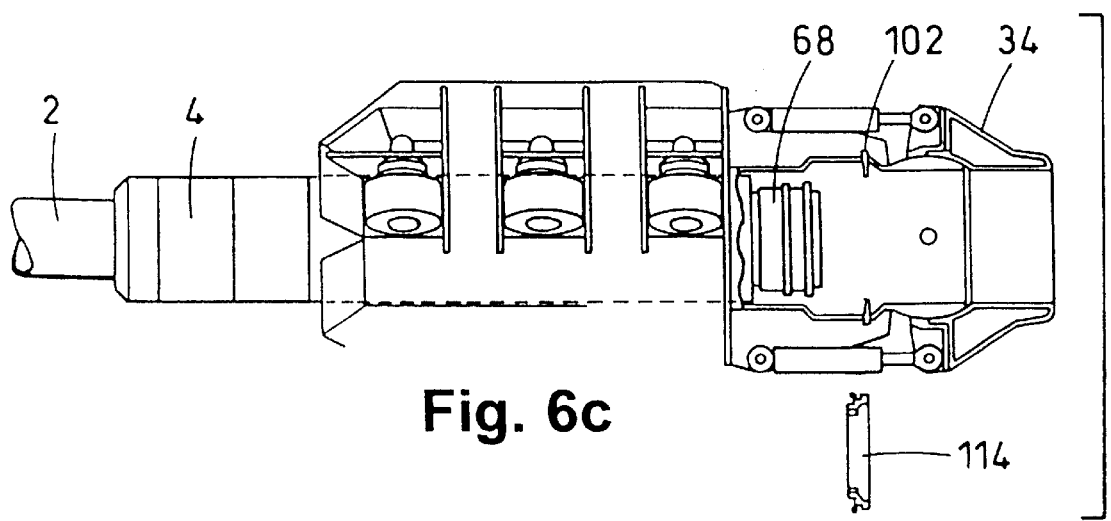
Figure 6D:
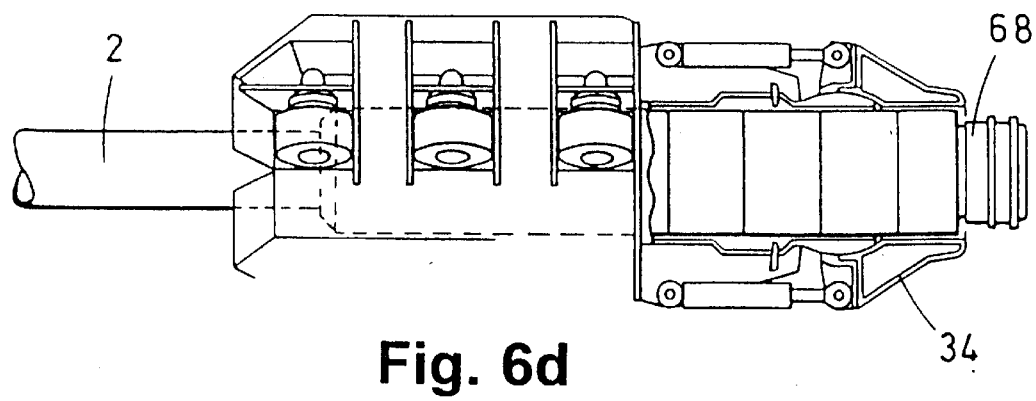

6b is initiated. At this moment, the latch ring 114 on the latch pins 102 is still kept in place, while the pressure cap 99 itself including the adjacent parts, hereunder the latches 108 etc. fall off and out of the tool and down to the sea bottom. Thereafter, the latch pins 102 are moved radially outwards with the result that also the latch ring 114 falls off and down to the sea bottom as shown in FIG. 6c. During this step, the pipeline is anew moved forward by means of the rollers 56 until the terminator moves out of the anchoring head 34 as shown in FIG. 6d, which is carried out for inspection, cleansing or the like. Thereafter, the pipeline including the terminator is anew moved rearwards into the tool, a fact which is rather advantageous because thereby, the pipeline including the terminator is protected against external damage etc. during the following transport and introduction into the anchor seat, as illustrated in FIG. 1l to FIG. 1m, n and o.

Embodiments of the first pipeline 2 including the jacket 4 and the terminator 68 are shown in detail in detail FIGS. 2a, b and c, showing three different embodiments of pipelines with complementary terminators, and equipment for adapting the gripping tool in accordance with the invention.

The situation in this connection is that the gripping tool in accordance with the invention shown in detail in FIGS. 3 and further 4a, b, c and d, will in the gripping position with inwardly pivoted arm couples, define a certain inner diameter which in the outset implies that the gripping tool is calibrated for one single pipeline or pipeline jacket diameter. In order to be able to utilise the gripping tool for different pipeline diameters, one has, however, constructed the gripping system on the gripping tool with dimensions of such size that it can handle a pipeline with the largest actual diameter. In order to be able to use the gripping tool simultaneously for pipelines having small diameters, one utilises special collars in connection with a special jacket 4 developed in connection with the invention.

In FIGS. 2a–d the numeral 2 designates the pipeline, the jacket 4 including the lining or bracing suitably made from ringshaped or troughshaped elements 62, 62 etc., which are matched together with a groove-and-tong configuration as shown The sections consist of troughshaped elements, preferably each representing 120°, i.e, three elements adding up to 360°, which are bolted together around the pipeline. The front part of the jacket around the pipeline 2 may as shown in FIGS. 2a and b consist of a pipeshaped sleeve 72, for instance made from steel, mounted on the pipeline. The spacing or clearance between the inside of the jacket element 60 and the pipeline is preferably made from an elastic material, such as rubber or a suitable plastic material which is positioned on to or adhered to the pipeline prior to the mounting of the outer jacket element 62, 62 etc. The unit comprising the jacket 4 on the pipeline, i.e. the jacket element 60 and the lining 66, is mounted on to the pipeline in above water surface position before submerging. The end section of terminator 68 on the pipeline is in the shown embodiment provided with a special socket 70 which is mounted at the outer end on an enlarged pipe extension 72, which forms a transition element between the pipeline 2 and the socket 68 with complementary coupling elements 74. This arrangement is used to dimensionally adapt the actual pipe to the terminator mounted on the pipeline on the template or bottom frame 10.

The pipeline 2 with adjoining equipment as shown in FIG. 2c constitutes a so called service line for forwarding of for instance electrical cables, hydraulic lines, control means and for instance a pipeline for methanol. All lines 63, 65, 67 etc. in the shown service line are encapsulated in a pipeshaped collar or jacket 80. made from steel or other pressure sustaining material, having a diameter which matches the described gripping means. Inside the pipeshaped terminator all necessary pipelines etc. are positioned as shown in the sectional Figures at the right side of FIG. 2c, showing a cross section along plane 2f—2f and 2g—2g respectively, shown at the left side of FIG. 2c. All pipelines, cables and other parts are being kept in position in the terminator by means of longitudinal and transverse bulkheads, which are including nipples 71 on an end pillow 69, coupled to a special terminator piece 73 an the collar 80.

Figure 8C:
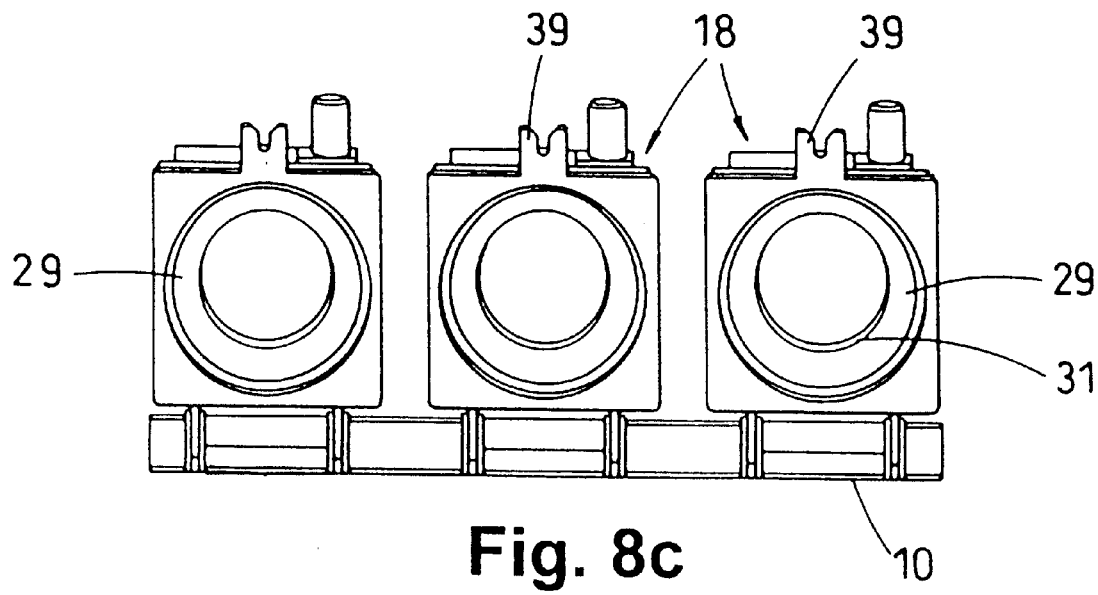

The receiving station 9 on the bottom frame or template 10 shall now be particularly described with reference to FIG. 7a and b, and FIG. 8a, b, c. On the frame 10 is on horizontal pivots 23 mounted a support frame 19 for the ringshaped seat 18. The frame 19 is preferably rectangular or square, as shown in FIG. 8a, and is on the top provided with a lug 39 for attachment of the pulling cable 31, shown for instance in FIG. 1d. In the frame 19 is supported the ringshaped seat 18, which as shown in FIG. 7b has two parts, namely an outer conical part 29 and an inner, substantially cylindrical part 35, which are dimensioned and adapted to receive the complementary formed surface on the anchoring head 34. The frame 19 with the seat 18 can be pivoted from an upper position, where the center axis A coincides with the central axis through the adjacent terminator and second pipeline 12, as shown in FIG. 7a. Furthermore, the frame 19 with seat can be pivoted down to a cantilevered, lowered position, as shown with a stitched line in FIG. 7a. The frame 19 is connected to a not shown lifting and latching system such that the seat can be locked in any desired angular position between upper and lower position. On the bottom frame 10 is at a distance from the seat 18 a bracket 15 for supporting the second pipeline 12, including the terminator or hub 14. At the outer end of pipeline 12 is mounted a clamp connector for clamping the first and the second pipelines tightly together in mounted position, as shown for instance in FIG. 1r. The clamp connector is preferably realized as a clamp chuck with circumferentially arranged segments, linked together and operated by means of a torque tool receptacle, such as a jack screw 15. It is important that suitable free space is available between the outer end, including the clamp connector on the second pipeline on one side, and the ringshaped seat on the other side, so that space is available for positioning and replacement of sealing elements, completing the coupling between the two pipelines. On the anchoring head 34 is furthermore provided a locking device with latches or pawls cooperating with complementary lock means provided on the frame 19, and/or around the periphery of the seat 18. These devices are not shown in the drawings, and can be of conventional construction.

Figure 9A:
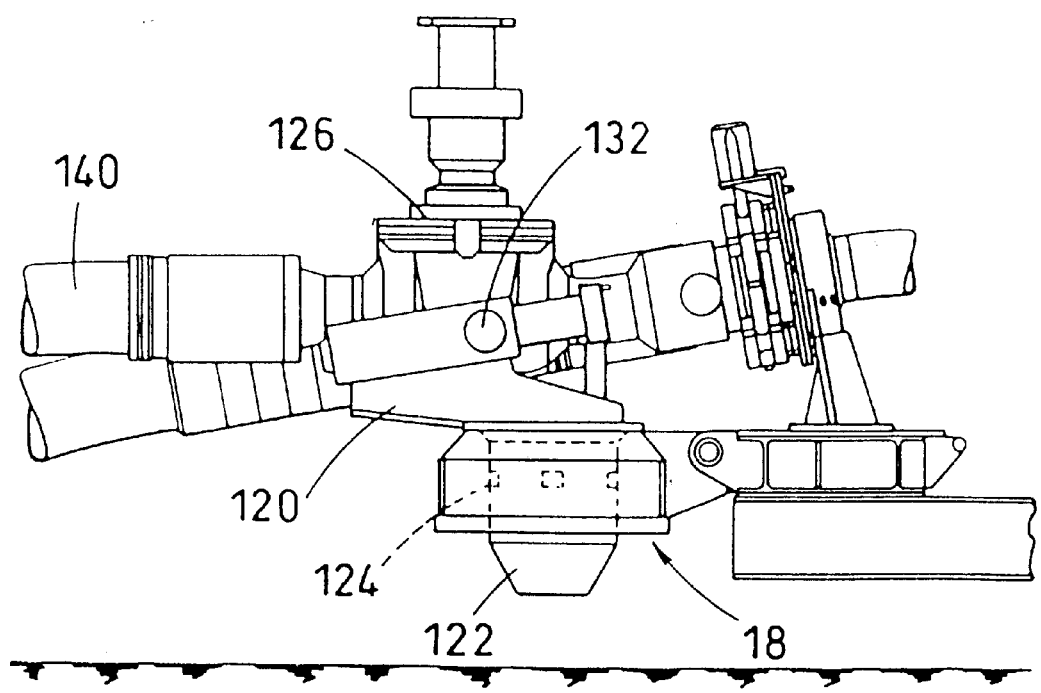
FIG. 9a, b and c show respectively a plan view, a lateral view and an end view of a modular installation as shown in FIG. 7, wherein the pivotal seat is utilized for alternative purposes, namely as basis for installation and mounting of supplemental equipment.
Figure 9B:
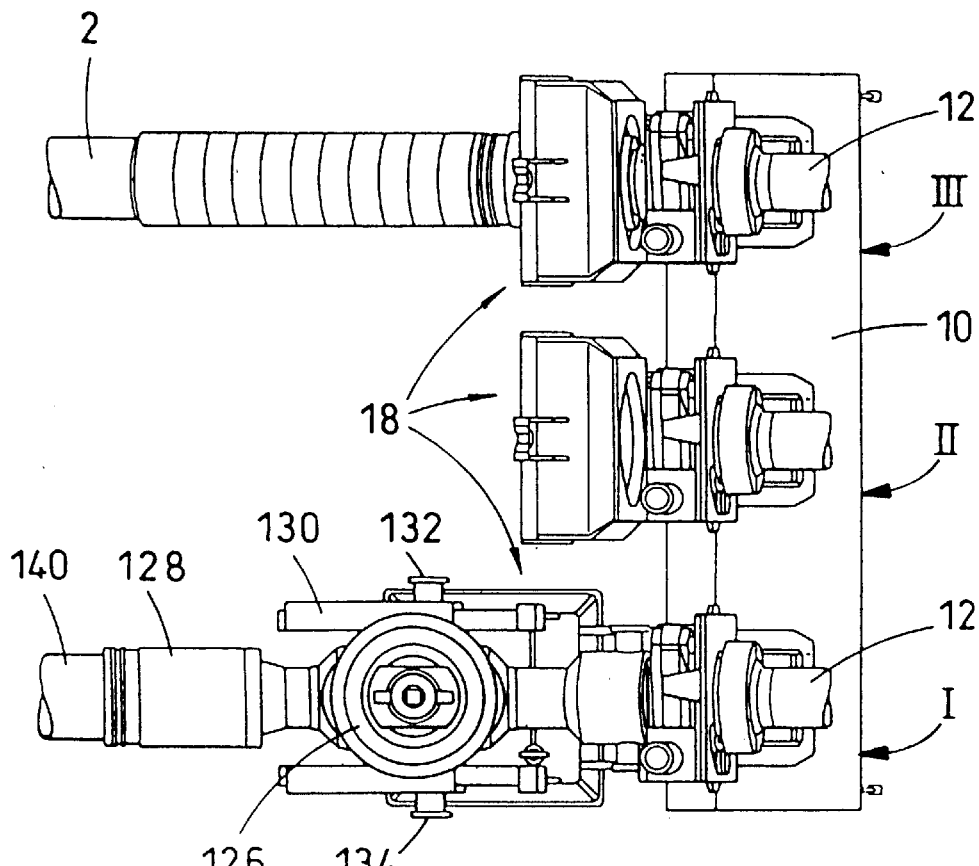
Figure 9C:
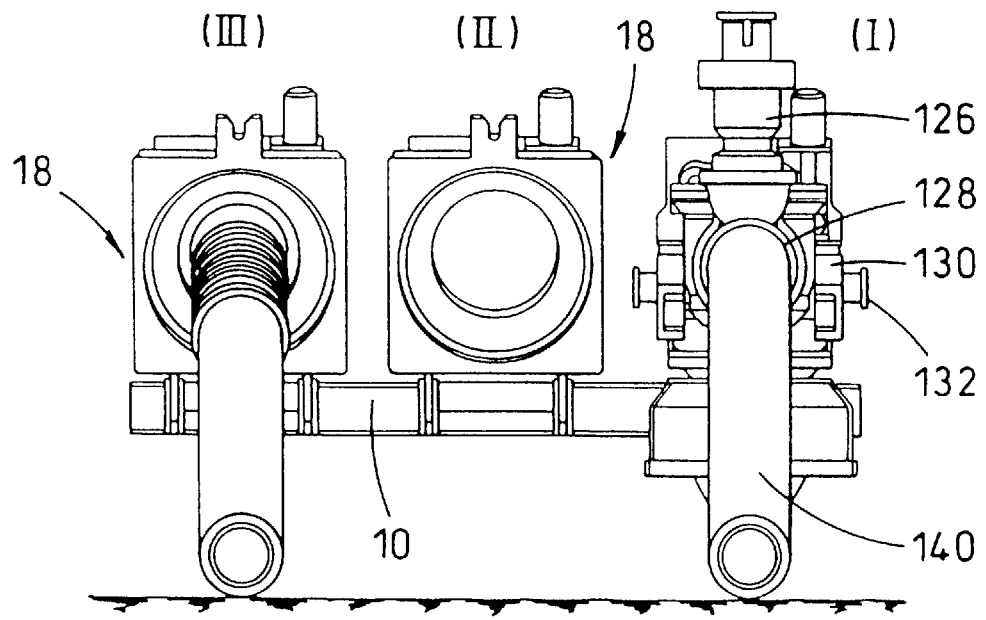

FIG. 8a, b and c illustrate a special embodiment of a receiving station for pipelines mounted on a bottom frame, comprising in the shown version a modular set of three funnelshaped ring seats 18, 18, 18, mounted as shown suitably mutually spaced side by side on a supporting frame of the bottom frame 10. In FIG. 8b is for illustrative purposes the center mounted seat 18 shown in upturned position, while the two others are turned down to horizontal cantilevered position. The special purpose of this arrangement shall in the following be described in connection with FIGS. 9a, b and c. In these Figures are illustrated two special aspects of the invention, namely an alternative supplemental use of the ring seat construction with a pivotal frame in connection with special pipe applications, and secondly, installation of different pipe combinations in a modular embodiment of the construction, including altogether three pipe coupling units. In FIG. 9b is shown a modular unit corresponding to the unit shown in FIG. 8a. In a unit designated I, the ring seat is pivoted down to horizontal position, and is used to mount one single pipe junction with a valve unit, as further illustrated in FIG. 8b, showing a side elevation of the pipe junction designated I at the bottom of FIG. 9a. As shown, the seat frame 18 is pivoted down to horizontal, fixed position, and in the seat opening is mounted a frame or basis 120 with an anchor plug 122 with suitable dimensions, and preferably provided with outwardly manoeuverable latches 124 for fixing of the basis 120 in the seat opening. In the basis 120 is mounted a pivotble valve unit 126, provided with a terminator 128 on the outside. The valve unit 126 is in the shown embodiment supported in a cradle 130, supported on pivots 132, 134, mounted in the basis 120, such that the valve unit 126 including the terminator 128 and the pipe 140 may be subjected to pivotal movements in the vertical plane, when released from the terminator on the bottom based pipeline. The unit III shown in FIG. 9b and 9c, is connected to a service cable, for instance corresponding to the one shown in 2c. FIG. 9b shows a front view of the unit shown in FIG. 8a.

The method and working operation for the construction and system in accordance with the invention, shall in the following be described with reference to the attached sequential FIGS. 1–1s, which together describe and show 19 different working steps from the situation when the ROV 6 with suspended gripping tool 8 is submerged down to position adjacent the equipment, which is illustrated in FIG. 1.

In step 2 shown in FIG. 1b, the gripping tool with the head 34 has moved into position in the ring seat 18, and is locked in the seat by means of the described circumferentially arranged radially movable latches 39, which are pressed into engagement against the inside edge of the ring seat 18. Thereafter, a manipulator tool 20 provided with a torque device, is put into engagement with a jack screw implement on the latches circumscribing the flange edges on the pressure cap, and holds this steadily on to the terminator on pipe 12.

Step 3: In FIG. 1c is shown the situation when the pressure cap has been released from the terminator, together with the intermediate packing or sealing means, and thereafter can be removed from the equipment.

Step 4: In FIG. 1d is illustrated the situation when a new sealing shall be put in place with complementary parts into the terminator 14 on the terminator on the second pipeline mounted in the bottom frame. The sealing unit is such devised that it will be seated in correct position in the seat ring beside the pipe socket on the terminator. The clamp connector element in the coupling tool 16 is in advance moved radially outwards by manoeuvering the jack screw 15. The jack screw arrangement is shown in detail in applicant's earlier Norwegian patent application no. 94.1668.

Step 5 is shown in FIG. 1e: A winch cable 31 is by means of the manipulator tool 20 pulled forward from a winch drum with winch motor 33, in the fore end of which is suitable arranged a catching ball or the like, which is brought into a slit-shaped ear 41, shown in more detail in FIG. 7. Thereafter, the anchor head 34 on the tool is released by pulling off the latches 39 as illustrated under step 6, shown in FIG. 1f. At the same time, the winch cable 31 will be pulled or winded off the winch drum.

In step 6 shown in FIG. 1f, the ROV is moved rearwards to correct position straight above the first freely positioned pipeline 2 including the jacket 4. The clawshaped arm couples in the tool are spread apart, as illustrated in FIG. 4. whereafter the ROV with the tool is passed over the pipeline in correct position, whereafter the arm couples anew are pivoted inwards and thereby gripping firmly around the collar or jacket 4. The first, freely positioned pipeline 2 rests in the shown embodiment on the sea bottom, designated by the letter <<S>>. During the positioning of the gripping tool, it is important that the gripping tool is mounted in correct axial position on the collar-like part of the jacket 4 on the pipeline 2, including the front terminator 5. The end of pipeline 2 is in above water position arranged with pressure resistant cover or pressure cap, which is kept in place by means of a special quick-lock, including special clawlike latches with intermediate locking elements. The terminator 5 is provided with a circumferential groove of in per se known design.

On the inside of the frame 22 for supporting the gripping arm 32 is arranged a number of circumferentially spaced radially pointing pins 102, which at the positioning of the gripping tool come into position behind a radial flange on the pressure cap on the pipeline. This position appears from step 7, shown in FIG. 1g. The gripping tool with the end part of the pipeline including the terminator 5 and the locking means 7 is shown with stitched lines.

Step 8: In this position, the jacket 4 on pipeline 2 is moved slightly backwards by actuating the transport rollers 56, shown in FIG. 1h. The pins 102 on the inside of the tool frame are moved inwards into a groove on the pressure cap 104, whereafter the jacket 4 is being moved further rearwards, having into consequence that the pressure cap 4 is pulled off the pipe end as illustrated in FIG. 1i. The pressure cap 104 is now completely loose and falls down into the sea bottom including the various locking elements as illustrated in connection with step 9 showing the pressure cap 104 in the situation when it falls out of the gripping tool.

Step 10: FIG. 1j shows step 10. Here the pipeline 2 via the jacket 4 is being moved forward, such that the terminator 68 arrives into position in front of the anchoring head 34. In this position, the valve seat on the terminator 68 is inspected and, if necessary, cleaned, since it now is exposed to the ambient sea water.

Step 11 is shownl in FIG. 1k. In this step, the pipeline 2 via the jacket 4 is anew moved backwards until a flange 108 arrives into position behind the radially pointing manoeuverable locking pins 98. Thereby, the pipeline 2 will, via the jacket 4, be locked against any further rearward movements. It shall at this point be remarked, however, that although the pipeline 2 via the jacket 4 and the roller 56 is mutually interlocked, it is only a question of mutual frictional contact which cannot be assumed to be sufficient for the next operation, which is illustrated in connection with step 12 shown in FIG. 11.

Step 12, shown in FIG. 1i, illustrates the transport operation. The winch 33 is started, pulling in the winch cable 31, which in advance has been attached in the ear 39 on the seat frame 21. In order to facilitate transport of the pipeline 2 forwards to the bottom frame 10 at the seat frame 21, one can utilise supplementary winch means and/or use other buoyant members, which for instance may be attached to the ROV.

Step 13 is shown in FIG. 1m. Here, there gripping tool with the pipeline 2 and the anchoring head 34 has been pulled into position in the ring seat 18 on the bottom frame. However, as it appears from FIG. 1m, the axis through the pipeline does not coincide with the axis through the ring seat and the terminator on the pipeline mounted in the bottom frame. The angular axis difference is now eliminated by manoeuvering the link arm system 32, monitoring the anchoring head 34, such as best shown in FIG. 3c.

Step 14 is shown in FIG. 1n and shows the position of the pipeline 2 with complementary parts relative to the ring seat when the respective axis extend coaxially flush with each other.

Step 15 is shown in FIG. 1o. During this step, the operation of the rollers 56 is actuated, such that the pipeline 2 via the jacket 4 is beting moved forward until the terminator including the socket and the front flange are moved into position on to the already positioned sealing means, positioned in the terminator on the second pipeline 12, mounted on the bottom frame 10. The respective terminators are in this position via the sealing flanges on the same and including the intermediately positioned sealing means brought into contact with each other.

Step 16: During step 16 shown in FIG. 1p, the pipe ends are coupled and locked together by means of the circumscribing clamp system by actuating the torque tool via the manipulating tool on the ROV, such that the jack screw on the clamp tool is being tightened. The coupling between the first and the second pipeline has now been accomplished.

Step 17 shown in FIG. 1q: The tool has been released from the seat ring. Firstly, the winch cable 33 is released from the ear on the seat frame, whereafter the anchoring head 34 is being released from the ring seat, whereafter the gripping tool moves rearwards*by reversing the rollers 56.*

Step 18 is shown in FIG. 1r. Here the ROV 6 including the gripping tool 8 is shown in position behind the jacket 4. In this position, the couplewise clamping means is moved to either side, whereafter the monitor 6 including the entire gripping tool 8 may be removed from the pipeline. This feature is shown in:

Step 19, shown in FIG. 1s, wherein the ready mounted coupling between the two pipelines 2 and 12, respectively, is shown in intercoupled position, circumscribed by the ring seat 18.

It will be understood that the attached drawings in conjunction with the above specification only relates to one preferred embodiment for the invention with necessary implements, since it is obvious that various modifications of such implements in the system can be altered without leaving the general scope of the invention, which is defined through the attached patent claims.

What is claimed is:

1. A submersible tool, adapted for mounting on a ROV, to be used for coupling together subsea pipelines including a first pipeline (2) which initially is located on a sea bottom or in submerged position in the sea, and a second pipeline (12) including a terminator (14) which is preinstalled on a bottom based template or frame (10), which tool (8) is equipped with a gripping device for catching and holding the first pipeline for transport to the second pipeline mounted on the bottom frame, characterized in that the tool (8) is provided with opposed, pivotable clawlike means (40,42) which forcibly may be pivoted between an outer position wherein the claw means can grasp around an intermediately positioned pipeline (2,4) and an inner position wherein the pipeline is seized firmly and directionally stable inside the pivotable claw means, power driven means (56,56) mounted in the tool (8) adjacent the claw means in order to impart in the claw means positioned pipeline (2,4) an axial movement relative to the tool (8), and which tool (8) at the front end is provided with a substantially ringshaped, forcibly pivotable, anchoring head (34) in position concentrially with the axis through the pipeline, which anchoring head (34) is adapted for anchoring in a complementary seat (18) mounted in position in front of said terminator (14) on the second pipeline mounted on the bottom frame (10).

2. A tool in accordance with claim 1, characterized in that the anchoring head (34) on the tool (8) is provided with means for locking the anchoring head (34) in position in the seat (18) on the bottom frame in position spaced in front of the terminator (14) on the second pipeline (12) mounted on the same.

3. A tool in accordance with claim 1, characterized in that the anchoring head (34) is suspended in a number of circumferentially distributed link suspended elements (32) on the tool (8), whereby the angular position of the anchoring head (34) can be adjusted relative to the longitudinal center axis through the tool.

4. A tool in accordance with claim 1, further including an external, substantially pipeshaped collar (60) with suitable diameter adapted to be received in an end section of the first pipeline (2), such that various pipeline dimensions may be diametrically adapted to said claw means, and which are dimensioned for handling the largest axial pipeline diameter.

5. A tool in accordance with claim 4, characterized in that the collar (60) is composed of a plurality of longitudinal and optionally transversely extending bucket-shaped elements which are fastened around the first pipeline.

6. A submersible tool system, for use in conjunction with a ROV, for coupling of subsea pipelines including a first pipeline which initially is localized on a sea bottom or in submerged position in the sea, and a second pipeline with a terminator which is installed on a bottom based frame, which tool system includes equipment for gripping, holding and transporting said first pipeline from an initial position to a position adjacent the pipeline mounted on the bottom frame, which tool for holding and transporting said first pipeline includes means for positioning the tool on the bottom frame in connection with the coupling operation of said two pipelines, characterized in that said tool (8) for holding and transporting said first pipeline comprises elements (56, 56) for axial movement of said first pipeline in rigidly held position in said tool, said elements for holding the tool on the bottom frame comprises a ringshaped anchoring head (34) positioned axially in front of said tool (8) such that said first pipeline can be moved forcibly through the anchoring head to a position on the bottom frame in position in front of said second pipeline (12) mounted on the same, and in that the elements on the bottom frame for receipt of the anchoring head (34) on the tool are realized as a ringshaped seat (18) adapted to circumscribe said first pipeline in position for carrying out the coupling operation, which ringshaped seat (18) is provided with cooperating means for holding and anchoring said anchoring head (34) in mounted position.

7. A tool system in accordance with claim 6, characterized in that said ringshaped seat (18) is pivotable about a horizontal transverse axis (23) from a substantially vertical position to a substantially horizontal position directed forwards, and in that said seat (18) may be locked in any desirable angular position.

8. A tool system in accordance with claim 6, further including a cantilevered terminator (14) at the outer end of the second pipeline (12) mounted on the bottom frame, which terminator is provided with pipe coupling means and further a clamp chuck system (14) with circumferentially arranged elements which are movable from an outer position wherein the elements have position spaced outside the pipe coupling means, and an inner position wherein the pipe coupling means on said first and said second pipelines is clamped together and provides a pressure and liquid sealed coupling between said two pipelines, and that complementary parts involved provide a substantial axial clearance or spacing between the inside of the ring seat (18) and the outside of the coupling means on said first pipeline, such that the pipe coupling means can be released axially in situ, for replacement of sealing elements.

9. A tool system in accordance with claim 8, characterized in that the clamp chuck system is operated by means of an upwardly directed jack screw (16) in such position that a temporary submerged manipulating tool mounted on a nearby ROV can accomplish the coupling between the pipelines, and optionally replacement of coupling elements including sealing elements in situ.

10. A tool system in accordance with claim 6, characterized in that in operational position, a pulling line (31) is extended between an attachment point (39) on one of the ring-shaped seat and the bottom frame, and backwards to the tool (8), suitably mounted on a ROV and in that on the tool (8) is mounted a winch for pulling the pulling line (31) and thereby said first pipeline in position in the tool, when the same is suitably elevated up from initial position on a sea bottom.

11. A tool system in accordance with claim 6, characterized in that said ring shaped seat (18) in horizontal, outwardly directed position forms support for a basis (120) including a downwardly pointing anchoring plug (122) positioned in the ring shaped seat opening, which basis (120) is provided with opposed arms between which the cradle (130) is supported by means of pivots (132, 134) and wherein further is supported a pivotable valve unit (126) including a pipe coupling (128).

12. A method for using a tool system in accordance with claim 6, comprising the steps of:

submerge the available ROV (6) including tool (8) down to a position above a pipeline (2), situated on a sea bottom, opening a claw tool (40, 42) by pivoting opposed clawlike arms, lowering the tool (8) down across the pipeline, closing the claw tool (40, 42), so that the pipe is encompassed and firmly held in the tool, elevating the ROV including the tool and the pipeline up from the sea bottom and transporting the ROV including the tool and the pipeline by means of a pulling line (31) to the bottom frame in a suitably elevated position, moving the tool forward such that the anchoring head (34) is positioned into the ring-shaped seat (18), putting the anchoring head (34) into engagement with a complementary locking means mounted in the ring-shaped seat, locking the anchoring head in the ring-shaped seat (18), adjusting the angular position of the anchoring head (34) by means of a link suspension supporting the anchoring head in front of the tool, such that the longitudinal axis through the pipeline held in the tool runs flush with the axis through the ring-shaped seat and the pipeline (12) mounted on the bottom frame (10), forcibly moving the pipeline (2) held in the tool forward so that the front end (68) on the first pipeline including the terminator thereon arrives into position against a coupling means on the terminator on said first pipeline, clamping together a circumscribing clamp system on said second pipeline mounted on the bottom frame by means of the coupling tool, having into consequence that the pipe coupling on said first and said second pipelines respectively are being pressed axially together, such that a pressure resistant and gas tight sealing is provided between adjacent ends of the first and second pipelines, releasing and rearwardly withdrawing the tool (8) including the anchoring head (34) from the seat (18), and releasing and removing the tool from the first pipeline (2).

13. A method in accordance with claim 12, further including the step of releasing and removing an optional end cap (99) on said first pipeline from the end of the first pipeline subsequent to the first pipeline being caught by the tool and kept firmly in the same by means of an adjacent tool, having a consequence that the end cap (99) is removed and dropped down to the sea bottom.

\* \* \* \* \*